Jan. 22, 1935. P. E. PRONSKE ET AL 1,989,025
ATTACHMENT FOR POULTRY BATTERIES
Filed July 25, 1933
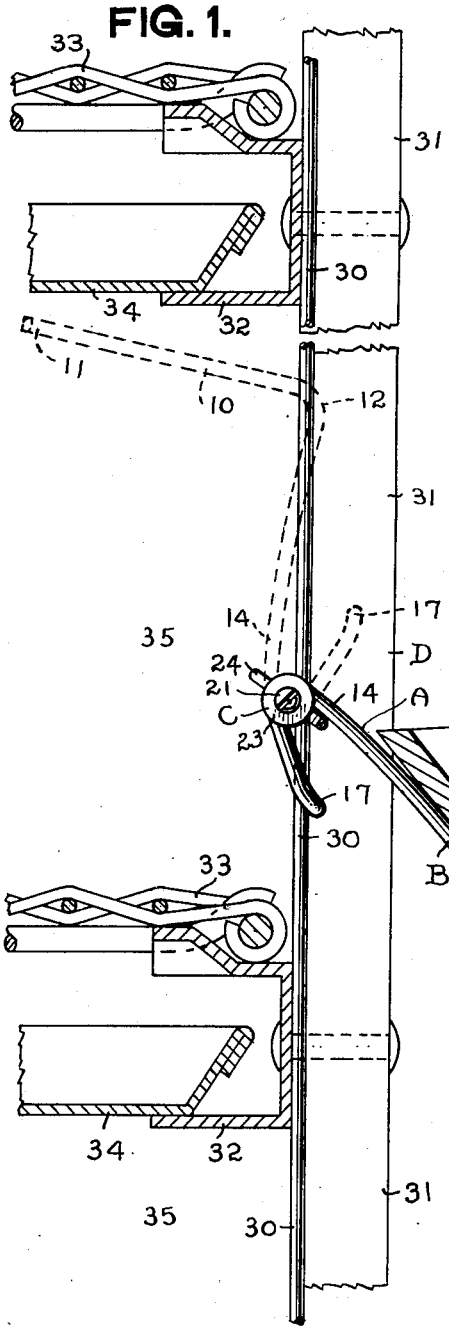
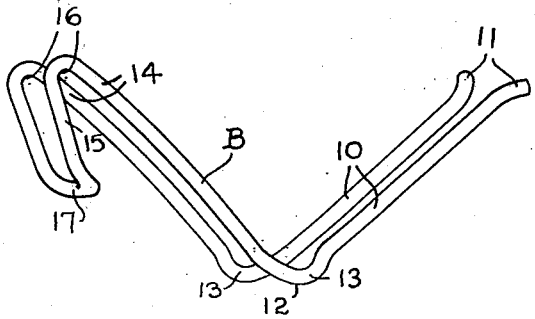
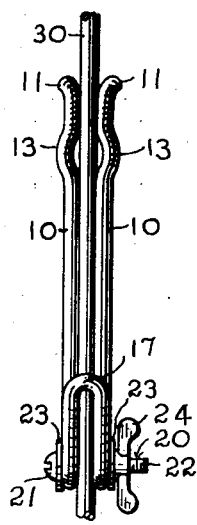
INVENTORS
Paul E. Pronske
John J. Doupnik
ATTORNEYS.

Patented Jan. 22, 1935

1,989,025

UNITED STATES PATENT OFFICE 1,989,025

ATTACHMENT FOR POULTRY BATTERIES

Paul E. Pronske and John J. Doupnik, Linn, Kans.

Application July 25, 1933, Serial No. 682,123

7 Claims. (Cl. 248—20)

This invention relates to an attachment for poultry batteries and the like and more particularly to a holder or support for the feed receptacles or troughs associated with poultry batteries or similar devices.

Among the objects of the invention is to provide a pivoted holder for the purpose which may be swung out of the way when not required.

Another object is to provide such devices which will support a conventional feed trough in a level position, so that feed, particularly liquid or semi-liquid feed, therein will remain at the same level along the length of the trough.

Still another object is to provide a support for the purpose mentioned which will not be apt to collect moisture, rust, and adhere to the battery bars, and will quickly spring from engagement with the bars when required.

Another object is to provide a battery trough support which is of such simple construction that it may be manufactured at a low cost, will take up but little room in packaging, and may be easily and thoroughly cleaned or sterilized.

Yet another object is to provide such a holder which is readily applied to batteries having supports of round or square cross section, as well as batteries and the like having slats of rectangular cross section.

Another object is to provide a support for a battery trough, which support may be readily applied or removed from the bars of a conventional battery without removing the bars or straining the parts of the support by manually spreading them apart so as to slip about the bars,—treatment which is apt to permanently distort the parts or break them and prevent proper functioning of the support.

Another object is to provide a support which may be quickly applied and removed as well as swung out of the way, all from the outside of the battery.

Other objects and advantages of the invention will be apparent during the course of the following detailed description, taken in connection with the accompanying drawing, forming a part of this specification and in which drawing:—

Figure 1 is a side elevation of the novel support attached to a conventional poultry battery and supporting a conventional feed trough.

Figure 2 is a front elevation of the support, swung out of the way.

Figure 3 is a perspective view of a bracket forming a portion of the novel support.

In the drawing, wherein for the purpose of illustration is shown only a preferred embodiment of the invention, the letter A designates generally the novel support or holder, comprising a bracket B and attaching means C, while the letter D designates a housing such as a conventional poultry battery and the letter E a receptacle such as a conventional feed trough.

The novel support or holder A is of a size to carry or support troughs of varying size yet is small enough so that it may be swung out of the way when not in use.

The bracket B is preferably a single length of resilient wire of fairly heavy gauge with the free ends thereof bent to form a pair of spaced apart, paralleling, substantially V-shaped arms 10. The tips of these arms are preferably curved or flared outwardly as at 11, while the apices of the V's are rounded as at 12 and are also bowed outwardly as at 13, shown particularly in Figure 2. The length of wire is further bent next adjacent the ends 14 of the arms opposite the curved tips, which ends 14 will be described as the inner ends of the arms, to form with the adjacent portions of said arms a pair of inverted, substantially paralleling and spaced apart J-shaped members 15, as shown particularly in Figures 1 and 3, the curve of the J's forming a pair of spaced apart aligning pivot receiving loops or bearings 16. Lastly, the length of wire is bent, preferably midway its ends, to form a bight 17. From Figure 2 it will be seen that the bight 17 forms with the shorter portion of the J-shaped members, exclusive of the bearings 16, a U-shaped member, while the bight 17 is also bent slightly towards the arms as in Figures 1 and 3 and when the support A is in the position shown in full lines in Figure 1, this bend is to one side of the vertical plane of the bearings 16. Preferably, the legs of the U-shaped member are fairly elongate and not quite one-third the length of either portion of the arms 10 so that the hook of the J is correspondingly deep and it will be further noted that the shorter portions of the J-shaped members and the associated portions of the arms 10 form substantially acute angles.

The means B for securing the bracket A in place, preferably comprises an elongate member which may be a stove bolt 20 having the usual slotted head 21 and screw threaded shank 22. This means may also include a pair of washers 23 and a thumb nut 24. This member is adapted to bridge the legs of the U-shaped member, which legs are of course also the shorter portions of the J-shaped members, and is disposed within the two loops or bearings 16. The washers 23 are outwardly of the loops 16, the head 21 of the bolt 20 retaining one washer while the thumb nut 24 retains the other.

The housing D, shown in Figure 1, is a portion of a conventional poultry receiving battery such as disclosed in detail in U. S. Letters Patent #1,863,982, dated June 21, 1932, and is shown simply by way of example as one device to which the novel holder A may be attached. It includes a plurality of spaced apart bar members 30 which are upright and of wire. The corners of the battery are provided with corner uprights 31 which extend out beyond the plane of the bar members 30 and there is also provided inwardly extending brackets 32, secured to the corner uprights 31, supporting a plurality of compartment floors 33 spaced one above the other, with pans 34 below and close adjacent the floors, all defining a plurality of compartments 35, containing the poultry. The bar members 30 are spaced apart a sufficient distance so that the heads and necks of the poultry can be extended thru the space between two adjacent bars and the poultry fed from a suitable receptacle outside the battery. Thus, the bars must, of necessity, be comparatively close together.

The receptacle E is shown by way of example as a conventional trough 40 which may be of wood, constructed by the poultryman from material at hand, or may be of metal shaped to form a V in cross section and closed at its ends. This has been found to be a desirable shape and is satisfactory so long as it may be maintained at such a level that the feed which may be liquid or semi-liquid, will be equally distributed along the length of the trough.

In use, the novel support or holder A may be attached to the battery bars in either of two simple ways. First, the bracket B may be grasped by the arms 10 and the spaced apart inverted J-shaped members positioned to either side of a bar member 30 with the bearings 16 inwardly. Now, the bolt 20, with one washer 23 and the thumb nut 24 removed, is slipped between the bearings 16 and bar members 30, until the other washer abuts the bracket and then the loose washer is placed upon the shank 22 and the thumb nut turned up until the two opposite paralleling portions of the bracket are fairly tight against the bar member. However, while this frictional contact will retain the holder in position, it will be now apparent that when the weight of a receptacle E is placed upon the support A, there will be a canting of the parts so that the shank 22 of the stove bolt 20 will bear against one side of the bar member while the bight 17 of the bracket B will bear against the opposite side of the bar member. Consequently, even should the thumb nut become loosened, the bracket will not slide along the bar member due to this canting.

A second easy way to attach the holder A is to first place the stove bolt 20, with the washers 23 and thumb nut 24 in place but with the washers fairly well spaced apart, and with the stove bolt crosswise and inwardly of the bar member. Now, by grasping the arms 10 of the bracket B and bringing the bearings 16 above the bolt and then pressing the two arms towards each other, the bracket may be drawn downwardly towards the bolt so that the bearings will slip between the washers and the thumb nut then turned to draw the bracket against the bar member.

When two or three of the supports A are in place, the trough 40 may be placed in position as shown in Figure 1 and the supports A adjusted so that the trough will be at a height above the battery floor 33 convenient for the poultry to feed and so that the feed will be evenly distributed thruout the length of the trough.

When not required, the trough may be lifted away, and the supports A swung to the position shown in dotted lines in Figure 1, where the U-shaped portion of the bracket is well within the plane of the corner upright 31 and consequently out of the way, the greater portion of the support projecting into the compartments 35. If desired, as when the corner uprights are small or do not project outwardly, the supports may be further swung from the position shown in dotted lines in Figure 1 until the U-shaped portion abuts the bar member. It will be noted that in either position there is no projecting portion to catch an adjacent battery.

The construction is such that the holders will not readily swing horizontally when supporting a trough, so that accidental striking against the ends of the trough will not swing the holders in an arc and thus dislodge the trough.

Since the holders do not depend at all on swinging horizontally to a position inwardly of the battery when not in use, they are adapted to support wide-mouthed troughs, since the supports which swing horizontally are limited in size to the distance between adjacent bars of the battery.

The novel clamping arrangement provided permits the use of the device on uprights both of round or square cross section as well as on slats, all supporting the holders equally as well.

There are no crevices nor pockets in the simple construction provided, so moisture will not be apt to collect and cause rusting of the supports.

The flared tips 11 and bowed portions 13 of the arms 10 permit the bracket to be easily slipped over and away from the bar member.

The support takes up but little room and consequently a large number may be packed, preferably nested, in a relatively small container for shipping and storage.

Various changes may be made to the form of invention herein shown and described, without departing from the spirit of the invention or the scope of the claims.

What is claimed is:

1. In a support for a feeding receptacle, a length of wire forming a receptacle-carrying portion, a substantially U-shaped portion and a bearing portion disposed between said first and second named portions, the legs of said U-shaped portion being disposed to form an acute angle with said receptacle-carrying portion, and means for drawing said legs toward each other, including a bridging member bridging said legs at said bearing portion and spaced from the bight of said U-shaped portion, said bridging member being disposed so that, when said device is in its normal, receptacle-supporting position, the vertical plane of the bight of said U-shaped portion lies between the bearing portion and said receptacle-carrying portion.

2. In a feeding receptacle support adapted to be attached to a bar member of a poultry battery, a single length of resilient wire with the free ends thereof forming a pair of substantially V-shaped arms and the intermediate section thereof forming a substantially U-shaped portion, the legs of said portion forming with said arms an acute angle, and means for drawing said legs towards each other, including a bridging member bridging said legs and spaced from the bight of said U-shaped portion, whereby said bight may engage one side of said bar member and the bridging member engage the opposite side thereof.

3. In a feeding receptacle support adapted to be attached to a bar member of a poultry battery, a single length of resilient wire with the free ends thereof forming a pair of substantially V-shaped arms and the intermediate section thereof forming a substantially U-shaped portion, the legs of said portion forming with said arms an acute angle and the bight of said U-shaped portion extending slightly towards said arms and means for drawing said legs toward each other including a detachable bridging member bridging said legs and spaced from the bight of said U-shaped portion.

4. In a feeding receptacle support adapted to be attached to a bar member of a poultry battery, a single length of resilient wire with the free ends thereof forming a pair of substantially V-shaped arms and the intermediate section thereof forming a substantially U-shaped portion, the legs of said portion forming with said arms an acute angle, and means for drawing said legs toward each other, including a detachable bridging member bridging said legs at the juncture of said arms and legs.

5. As an article of manufacture, a bracket for a poultry feeding receptacle, said bracket attachable to a poultry battery and the like, comprising a single length of resilient wire with at least one free end portion adapted to form a receptacle supporting arm, another portion of said wire bent to form a substantially U-shaped member with at least one leg thereof forming with said arm an acute angle having an open loop at the juncture of said leg and arm and the other leg of said U-shaped member provided with a similar open loop substantially paralleling the first named loop.

6. As an article of manufacture, a bracket for a poultry feeding receptacle, said bracket attachable to a poultry battery and the like, comprising a single length of resilient wire with the free ends thereof bent to form a pair of spaced apart paralleling arms, the middle portion bent to form a substantially U-shaped member and the portion between said arms and said U-shaped member bent to form with the adjacent parts of said arms and the legs of said U-shaped member a pair of spaced apart loops.

7. As an article of manufacture, a bracket for a poultry feeding receptacle, comprising a single length of resilient wire with the free ends thereof bent to form a pair of spaced apart, paralleling, substantially V-shaped arms, said length of wire further bent next adjacent the inner ends of said arms to form with the adjacent substantially one-half of said arms a pair of inverted substantially J-shaped members, said J-shaped members spaced apart and paralleling each other, and said length of wire lastly bent midway its ends to form a bight between said J-shaped members.

PAUL E. PRONSKE.
JOHN J. DOUPNIK.